US 9,154,552 B2

(12) United States Patent
Hickmott et al.

(10) Patent No.: US 9,154,552 B2
(45) Date of Patent: *Oct. 6, 2015

(54) METHOD AND APPARATUS FOR COOPERATIVE FILE DISTRIBUTION WITH RECEIVER DETERMINED QUALITY OF SERVICES

(75) Inventors: Andrew Hickmott, New York, NY (US); Avi Cohen, Demarest, NJ (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 26 days.

This patent is subject to a terminal disclaimer.

(21) Appl. No.: 13/590,092

(22) Filed: Aug. 20, 2012

(65) Prior Publication Data

US 2012/0317246 A1   Dec. 13, 2012

Related U.S. Application Data

(63) Continuation-in-part of application No. 11/850,793, filed on Sep. 6, 2007, now Pat. No. 8,250,191.

(51) Int. Cl.
*G06F 15/16* (2006.01)
*H04L 29/08* (2006.01)
*H04L 12/14* (2006.01)

(52) U.S. Cl.
CPC .............. *H04L 67/104* (2013.01); *H04L 67/02* (2013.01); *H04L 67/108* (2013.01); *H04L 67/1085* (2013.01); *H04L 12/1485* (2013.01); *H04L 67/06* (2013.01)

(58) Field of Classification Search
USPC ................................................ 709/223–225
See application file for complete search history.

(56) References Cited

U.S. PATENT DOCUMENTS

| 5,548,648 | A | 8/1996 | Yorke-Smith |
| 5,771,355 | A | 6/1998 | Kuzma |

(Continued)

FOREIGN PATENT DOCUMENTS

| GB | 2440774 A | 2/2008 |
| JP | 2004070712 A | 3/2004 |

(Continued)

OTHER PUBLICATIONS

Dongyan: Analysis of a CDN-P2P hybrid architecture for cost-effective streaming media distribution.*

(Continued)

*Primary Examiner* — Evans Desrosiers
(74) *Attorney, Agent, or Firm* — Ben Tabor; Kate Drakos; Micky Minhas

(57) ABSTRACT

Methods and apparatus are provided for cooperative file distribution with receiver determined quality of services. A receiver obtains a file by selecting a target rate for downloading a file, identifying one or more unreliable data sources and one or more reliable data sources wherein each source contains one or more portions of the file, obtaining at least a portion of the file from the one or more unreliable data sources at a first rate, determining a throttle rate for downloading at least another portion of the file from the one or more reliable data sources, retrieving the at least another portion of the file from the one or more reliable data sources at a second rate, and adjusting the throttle rate such that an amount of data obtained from the one or more reliable data sources is minimized, and the target rate is maintained.

28 Claims, 10 Drawing Sheets

(56) References Cited

U.S. PATENT DOCUMENTS

| | | |
|---|---|---|
| 5,941,951 A | 8/1999 | Day et al. |
| 5,963,646 A | 10/1999 | Fielder et al. |
| 6,104,810 A | 8/2000 | DeBellis et al. |
| 6,108,687 A | 8/2000 | Craig |
| 6,119,142 A | 9/2000 | Kosaka |
| 6,304,898 B1 | 10/2001 | Shiigi |
| 6,321,252 B1 | 11/2001 | Bhola et al. |
| 6,343,738 B1 | 2/2002 | Ogilvie |
| 6,938,042 B2 | 8/2005 | Aboulhosn et al. |
| 7,054,905 B1 | 5/2006 | Hanna et al. |
| 7,113,948 B2 | 9/2006 | Jhingan et al. |
| 7,213,263 B2 | 5/2007 | Makineni et al. |
| 7,234,032 B2 | 6/2007 | Durham et al. |
| 7,257,837 B2 | 8/2007 | Xu et al. |
| 7,269,646 B2 | 9/2007 | Yamamoto et al. |
| 7,328,280 B2 | 2/2008 | Takeda et al. |
| 7,333,492 B2 | 2/2008 | Wu et al. |
| 7,398,301 B2 | 7/2008 | Hennessey et al. |
| 7,403,969 B2 | 7/2008 | White |
| 8,250,191 B2 | 8/2012 | Hickmott et al. |
| 2002/0010748 A1 | 1/2002 | Kobayashi et al. |
| 2002/0026481 A1 | 2/2002 | Mori et al. |
| 2002/0049786 A1 | 4/2002 | Bibliowicz et al. |
| 2002/0080721 A1 | 6/2002 | Tobagi et al. |
| 2002/0184451 A1 | 12/2002 | Dovi |
| 2003/0093565 A1 | 5/2003 | Berger et al. |
| 2003/0204602 A1 | 10/2003 | Hudson et al. |
| 2004/0103208 A1 | 5/2004 | Chung et al. |
| 2004/0128347 A1 | 7/2004 | Mason et al. |
| 2004/0148344 A1 | 7/2004 | Navar et al. |
| 2004/0172476 A1 | 9/2004 | Chapweske |
| 2004/0260701 A1 | 12/2004 | Lehikoinen et al. |
| 2005/0055455 A1 | 3/2005 | Asher |
| 2005/0091316 A1 | 4/2005 | Ponce et al. |
| 2005/0138197 A1* | 6/2005 | Venables ............ 709/232 |
| 2005/0203851 A1 | 9/2005 | King et al. |
| 2006/0190589 A1 | 8/2006 | Parker |
| 2006/0224687 A1 | 10/2006 | Popkin et al. |
| 2006/0236386 A1 | 10/2006 | Popkin |
| 2006/0282536 A1 | 12/2006 | Popkin et al. |
| 2007/0005694 A1 | 1/2007 | Popkin et al. |
| 2007/0050492 A1* | 3/2007 | Jorgensen ............ 709/223 |
| 2008/0028017 A1 | 1/2008 | Garbow et al. |
| 2008/0037438 A1 | 2/2008 | Twiss et al. |
| 2008/0040501 A1 | 2/2008 | Harrang et al. |
| 2008/0043256 A1 | 2/2008 | Broda et al. |
| 2008/0066182 A1 | 3/2008 | Hickmott et al. |

FOREIGN PATENT DOCUMENTS

| | | |
|---|---|---|
| JP | 2005295111 A | 10/2005 |
| WO | 0110125 A1 | 2/2001 |
| WO | 0110128 A1 | 2/2001 |
| WO | 02065329 A1 | 8/2002 |
| WO | 03005244 A2 | 1/2003 |
| WO | 03005654 A1 | 1/2003 |
| WO | 03043301 A2 | 5/2003 |
| WO | 2006062066 A1 | 6/2006 |

OTHER PUBLICATIONS

Dongyan: Analysis of a CDN-P2P hybrid architecture for cost-effective streaming media distribution p. 383-399. Mar. 17, 2006.*

Cohen, B., "Incentives Build Robustness in BitTorrent," Available at http://www.bittorrent.org/bittorrentecon.pdf, May 22, 2003, 5 pages.

Su, X., "Middleware for Multimedia Mobile Collaborative System," IEEE ComSoc sponsored Third Annual Wireless Telecommunications Symposium (WTS2004), May 2004, 8 pages.

Cohen, B., BitTorrent Home Page, Available at http://www.bittorrent.com as Early as Sep. 2004, 1 page.

Cohen, B., BitTorrent Documentation, Available at http://www.bittorrent.com/documentation.html as Early as Sep. 2004, 1 page.

Cohen, B., BitTorrent Guide, Available at http://www.bittorrent.com/guide.html as Early as Sep. 2004, 2 pages.

Cohen, B., BitTorrent Protocol, Available at http://www.bittorrent.com/protocol.html as Early as Sep. 2004, 5 pages.

Groove Networks, Enterprise Relay Server Version 3.0 Administrator's Guide, Available at http://web.archive.org/web/20041108231255/http://docs.groove.net/admin/ers/RelayServerAdministratorsGuide.pdf, Nov. 8, 2004, 114 pages.

Gkantsidis, C. et al., "Network Coding for Large Scale Content Distribution," IEEE INFOCOM 2005, Mar. 2005, 12 pages.

International Bureau of WIPO, International Preliminary Report on Patentability Issued in Application No. PCT/US2008/075371, Mar. 9, 2010, WIPO, 6 pages.

Japanese Patent Office, Notification of Rejection Issued in Application No. 2010-524173, Jan. 8, 2013, 6 pages.

European Patent Office, Office Action Issued in Application No. 08829614.0, Apr. 19, 2013, Netherlands, 5 pages.

Japanese Patent Office, Notification of Rejection Issued in Application No. 2010-524173, Aug. 13, 2013, 4 pages.

* cited by examiner

METHOD AND APPARATUS FOR COOPERATIVE FILE DISTRIBUTION WITH RECEIVER DETERMINED QUALITY OF SERVICES

CROSS-REFERENCE TO RELATED APPLICATIONS

This application claims the benefit of, and priority to, under 35 U.S.C. §120 as a continuation-in-part to U.S. patent application Ser. No. 11/850,793, filed Sep. 6, 2007, entitled "Methods And Apparatus For Cooperative File Distribution With Target Data Delivery Rate", by Hickmott et al., status allowed, the disclosure of which is incorporated herein by reference in its entirety. This application is also related to U.S. patent application Ser. No. 11/096,193, entitled "Method and Apparatus for Offline Cooperative File Distribution Using Cache Nodes," and U.S. patent application Ser. No. 11/096,194, entitled "Method and Apparatus for Cooperative File Distribution in the Presence of Firewalls," each filed Mar. 31, 2005; U.S. patent application Ser. No. 11/150,532, entitled "System and Method for Multi-Channel Email Communication," filed Jun. 11, 2005; U.S. patent application Ser. No. 11/171,748, entitled, "System and Method for Distributed Multi-Media Production, Sharing and Low Cost Mass Publication," filed Jun. 30, 2005; and U.S. patent application Ser. No. 11/519,990, entitled, "Security Techniques for Cooperative File Distribution," filed Sep. 12, 2006. The disclosures of each of which are incorporated herein by reference in their entireties.

BACKGROUND

1. Field

The aspects of the disclosed embodiments generally related to communication methods and systems, and more particularly, to methods and apparatus for cooperative file distribution with receiver determined quality of services (QoS).

2. Brief Description of Related Developments

The providers of popular, large digital files, such as software, music or video files, must keep pace with the ever increasing bandwidth demands for delivering such files. As the popularity of a file increases, a larger number of users are requesting the file and more bandwidth is required to deliver the file. If a file is to be conventionally delivered by a central server via the Hypertext Transfer Protocol (HTTP), the bandwidth requirements increase linearly with the number of requesting users, and quickly become prohibitively expensive.

A number of techniques have been proposed or suggested for reducing the bandwidth demands of file delivery on the server, using peer-to-peer content sharing. In a peer-to-peer content sharing model, often referred to as "cooperative distribution," one or more users that have downloaded one or more files from the server can share the file(s) with other users. A cooperative distribution model allows a server to deliver large files in a reliable manner that scales with the number of requesting users. Among other benefits, cooperative distribution models exploit the under-utilized upstream bandwidth of existing users.

The BitTorrent file distribution system, described, for example, in http://www.bittorrent.com, is an example of a cooperative distribution technique. When multiple users are downloading the same file at the same time using the BitTorrent file distribution system, the various users upload pieces of the file to each other. In other words, a BitTorrent user trades pieces of a file that the user has with other required pieces that other users have until the complete file is obtained. In this manner, the cost of uploading a file is redistributed to the users of the file and the cost of hosting a popular file becomes more affordable. In addition, U.S. patent application Ser. No. 11/096,193, filed Mar. 31, 2005, entitled "Method and Apparatus for Offline Cooperative File Distribution Using Cache Nodes," discloses a cooperative file distribution system that uses one or more storage proxies to store the files that are being transferred among users.

While such cooperative file distribution systems provide an effective mechanism for distributing large files in a cost effective manner, they suffer from a number of limitations, which if overcome, could further improve the utility and efficiency of cooperative file distribution. In particular, it is difficult to guarantee a desired quality of service, such as a desired data delivery rate. A need therefore exists for improved cooperative file distribution systems that can satisfy a target data delivery rate. Yet another need exists for cooperative file distribution systems that supplement the peer-to-peer content sharing with more reliable data sources, such as web servers.

Accordingly, it would be desirable to provide methods and apparatus for cooperative file distribution that addresses at least some of the problems identified above.

BRIEF DESCRIPTION OF THE DISCLOSED EMBODIMENTS

As described herein, the exemplary embodiments overcome one or more of the above or other disadvantages known in the art.

One aspect of the exemplary embodiments relates to a method for downloading a file in a cooperative file distribution system. In one embodiment, the method includes selecting a target rate by a node for downloading a file. The method also includes identifying one or more unreliable data sources and one or more reliable data sources wherein each source contains one or more portions of the file. The method further includes obtaining at least a portion of the file from the one or more unreliable data sources at a first rate. Moreover, the method includes determining a throttle rate by the node for downloading at least another portion of the file from the one or more reliable data sources. Furthermore, the method includes retrieving the at least another portion of the file from the one or more reliable data sources at a second rate. Finally the method includes adjusting the throttle rate such that an amount of data obtained from the one or more reliable data sources is minimized, and the target rate is maintained.

Another aspect of the exemplary embodiments relates to a system for downloading a file in a cooperative file distribution system. In one embodiment, the system includes a control server and a receiver. The receiver is configured to select a target rate for downloading a file, identify one or more unreliable data sources and one or more reliable data sources wherein each source contains one or more portions of the file, obtain at least a portion of the file from the one or more unreliable data sources at a first rate, determine a throttle rate for downloading at least another portion of the file from the one or more reliable data sources, retrieve the at least another portion of the file from the one or more reliable data sources at a second rate, and adjust the throttle rate such that an amount of data obtained from the one or more reliable data sources is minimized, and the target rate is maintained.

Yet another aspect of the exemplary embodiments relates to an article of manufacture for downloading at least one file in a cooperative file distribution system. In one embodiment, the article includes a non-transitory machine readable storage medium with program instructions which when executed implements, selecting a target rate by a receiver for downloading the file, identifying one or more unreliable data sources and one or more reliable data sources by the receiver wherein each source contains one or more portions of the file, obtaining at least a portion of the file from the one or more unreliable data sources at a first rate, determining a throttle rate by the receiver for downloading at least another portion of the file from the one or more reliable data sources, retrieving the at least another portion of the file from the one or more reliable data sources at a second rate, and adjusting the throttle rate by the receiver such that an amount of data obtained from the one or more reliable data sources is minimized, and the target rate is maintained.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

DETAILED DESCRIPTION OF THE EXEMPLARY EMBODIMENTS OF THE DISCLOSURE

The present disclosure is generally directed towards methods and apparatus for cooperative file distribution with receiver determined quality of services. As will be understood, the various diagrams, flow charts and scenarios described herein are only examples, and there are many other scenarios to which the present disclosure will apply.

Figure 1:
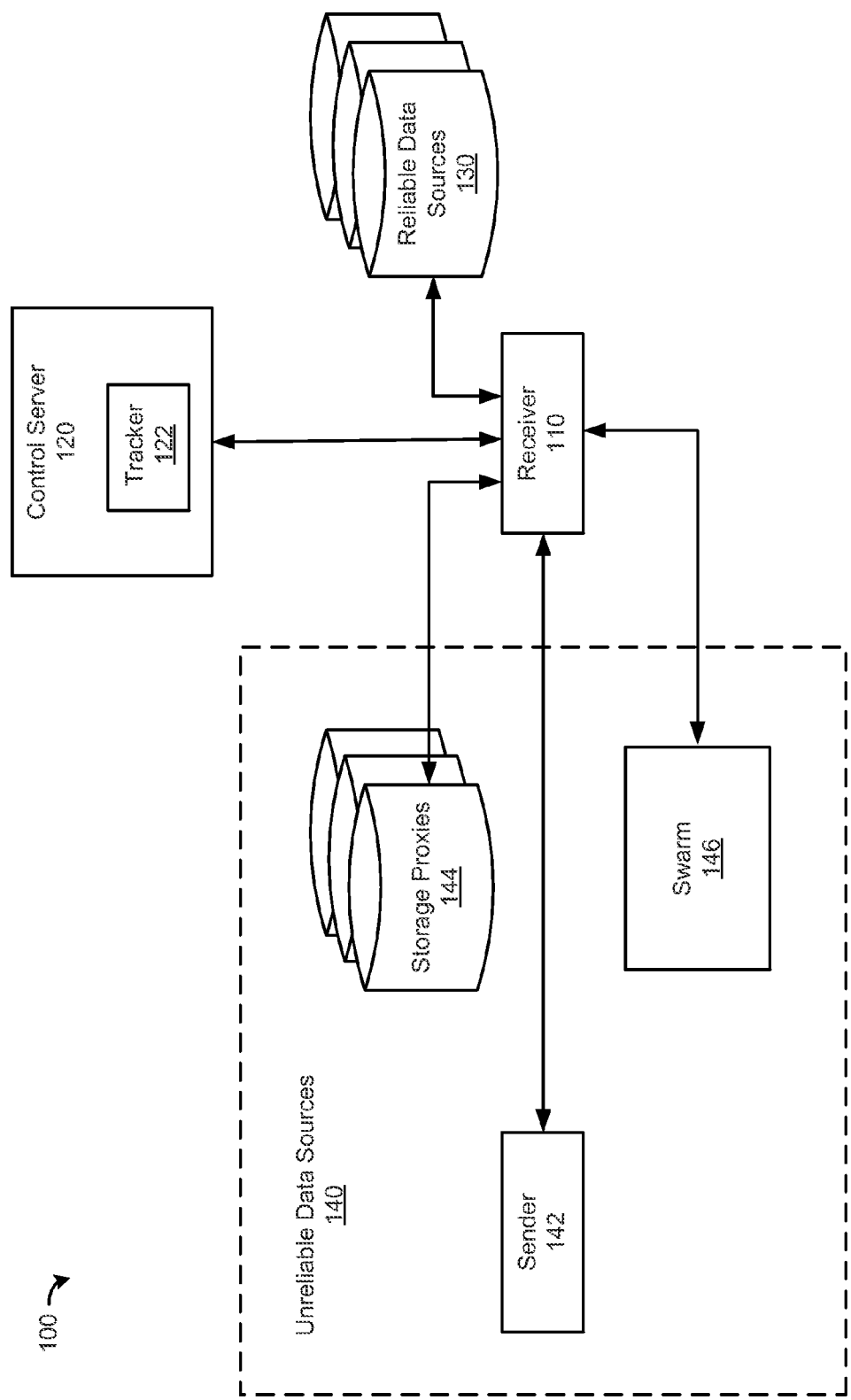
FIG. 1 is a schematic diagram generally representing an exemplary architecture of system components for a cooperative file distribution system incorporating aspects of the present disclosure.

Referring to FIG. 1, a schematic diagram generally representing an exemplary architecture of system components for a cooperative file distribution system 100 incorporating aspects of the present disclosure is illustrated. The cooperative file distribution system 100 may be implemented partially based on, for example, the BitTorrent™, the Pando™ file distribution systems, or a combination thereof as modified herein to provide the features and functions of the present disclosure. The Pando file distribution system may be implemented using the Pando Platform, available at http://www-.pando.com, all incorporated by reference herein. Alternative basic systems or protocols include eDonkey, Gnutella, and so on.

As discussed hereinafter, the cooperative file distribution system 100 includes a control server 120 which manages file distribution. Particularly, a tracker 122 in the control server 120 may be implemented to coordinate communication between peers in the cooperative file distribution system 100. The tracker 122 may maintain status information of all clients. Specifically the tracker 122 may identify the network location of each client either uploading or downloading a file, and further tracks which fragment(s) of that file each client possesses so that it may coordinate efficient data sharing between clients. Therefore, a receiver 110 may communicate with the tracker 122 to initiate downloads. The tracker 122 may be public which can be used by anyone. Alternatively, the tracker 122 may be configured to be private which generally provides higher speeds, a tighter community, and safer downloads but requires registration and/or fees from clients.

In the cooperative file distribution system 100, the receiver 110 may selectively download fragment(s) of a file from either the reliable data sources 130 or unreliable data sources 140. The reliable data sources 130 may be web servers or content delivery networks (CDNs) that able to consistently deliver data in a high speed, for example, using the HTTP or FTP protocol. The unreliable data sources 140 may include a sender 142 of the file which can not be guaranteed to be online when the receiver 110 is downloading the file. Moreover the unreliable data sources 140 may include a swarm 146, a group of clients who join a "swarm" of hosts to download and upload from each other simultaneously, therefore cooperatively distribute files in the cooperative file distribution system 100. As more clients join the swarm 146, the likelihood of a complete successful download by any particular client increases.

In addition, the unreliable data sources 140 optionally employs one or more storage proxies 144, as described in U.S. patent application Ser. No. 11/096,193, entitled "Method and Apparatus for Offline Cooperative File Distribution Using Cache Nodes."

Advantageously the receiver 110 may select a target rate for downloading a file in the cooperative file distribution system 100. By selectively downloading fragment(s) of the file from the reliable data sources 130 or unreliable data sources 140, the target rate for downloading may be achieved and maintained. Particularly a bandwidth targeting algorithm may be used to request data from a reliable data source 130.

The requested bandwidth from the reliable data source 130 is so called throttle rate for downloading. Generally, the receiver 110 uses an algorithm to achieve the target rate with a minimally sufficient throttle rate without reducing the data downloading rate from the unreliable data sources 140. In this manner, various embodiments of the present disclosure maximize utilization of the lower cost unreliable data sources 140, and minimize the utilization of the higher cost reliable data sources 130.

The systems and devices referred to in FIG. 1, such as the receiver 110, server 120, tracker 122, sources 130, sender 142, proxies 144 and swarm 144, may comprise hardware, software, or firmware comprised of machine-readable instructions that are executable by a processing device. Each can include, is coupled to or is in communication with a processor that is operable to carry out the processes generally described herein.

Thus, a block may refer to hardware or a combination of hardware and software performing a function. Moreover those skilled in the art will appreciate that the functions implemented within a block illustrated in the diagram may be implemented as separate components or the functions of several or all of the blocks may be implemented within a single component. For example, the tracker 122 may be implemented outside of the control server 120 as a separate server. For another example, the sender 142 may joined the swarm 146 to actively participating in uploading and downloading activities.

Figure 2:
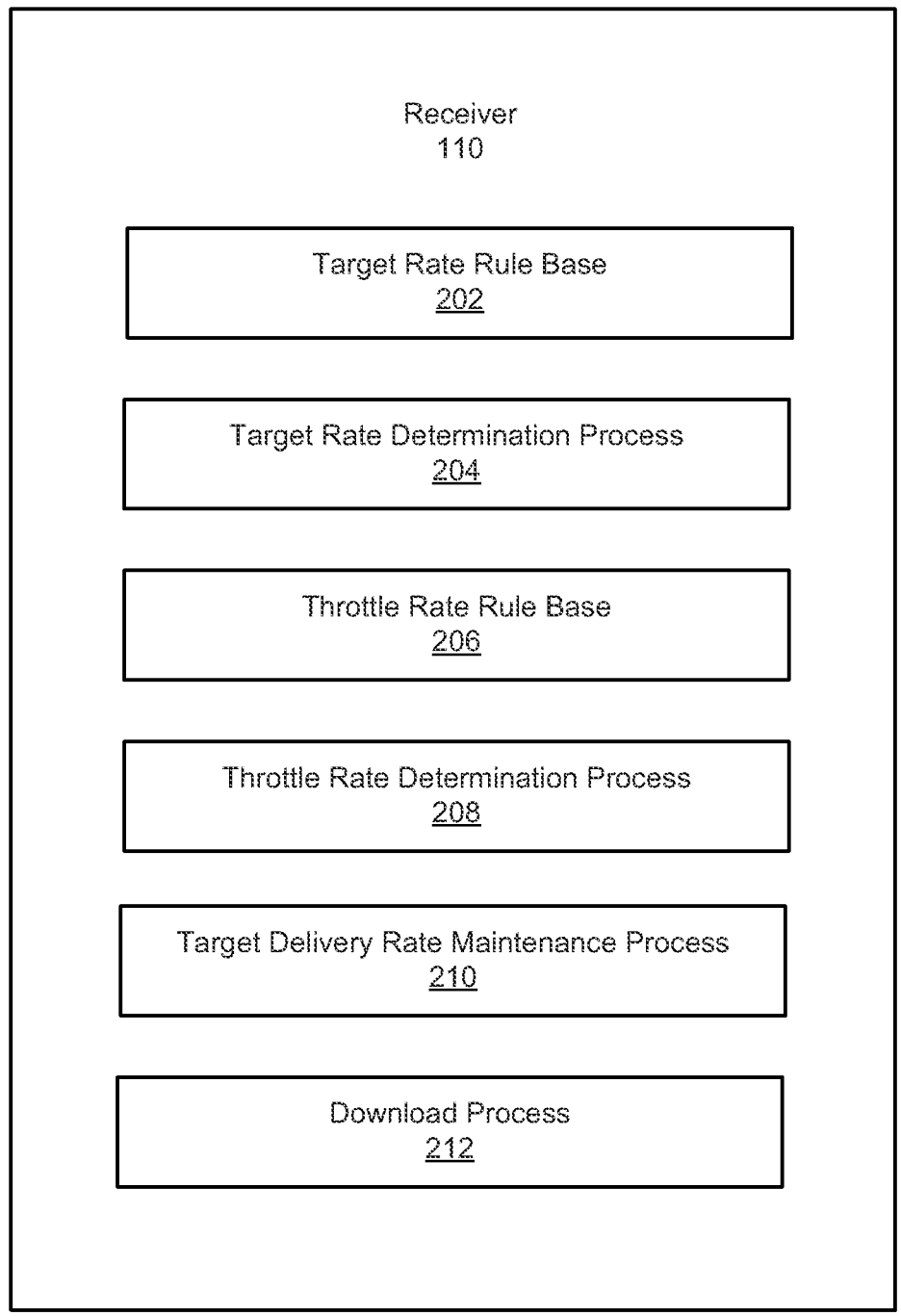
FIG. 2 is a block diagram generally representing an exemplary receiver configured to determine quality of services incorporating aspects of the present disclosure.

Now turning to FIG. 2, there is a block diagram generally representing an exemplary receiver configured to determine quality of services incorporating aspects of the present disclosure. A receiver 110 may include a target rate rule base 202 and a target rate determination process 204. The target rate determination process 204 dynamically determines a target rate for the receiver 110 to download a file based on one or more exemplary business rules in the target rate rule base 202.

The business rules may be based on, for example, the content of the file, the contract between the receiver 110 and the control server 120, the contract between the receiver 110 and its Internet Service Provider (ISP), the use pattern of the receiver 110, a manual target rate input from a user, or the reconciliation of multiple rules. A target rate so determined generally corresponds to a certain level of quality of services if the target rate can be subsequently achieved and maintained.

Moreover, the receiver 110 may include a throttle rate rule base 206 and a throttle rate determination process 208. The throttle rate determination process 208 dynamically determines a throttle rate for the receiver 110 to download data from the reliable data sources 130 based on one or more exemplary business rules in the throttle rate rule base 206.

The business rules for determining a throttle rate may be based on, for example, the performance of the unreliable data sources 140, the content of the file, the contract between the receiver 110 and the control server 120, the use pattern of the receiver 110, a manual throttle rate input from a user, or the reconciliation of multiple rules. A throttle rate so determined generally represents the requested download rate from the reliable data sources 130.

Furthermore, the receiver 110 may include a target rate maintenance process 210 and a download process 212. In one embodiment, the target rate maintenance process 210 can dynamically modify the throttle rate to achieve and maintain the given target rate. The modified throttle rate is then used by the receiver 110 in the download process 212, as an example, to determine the size and rate of HTTP requests for portions of the file from the reliable data sources 130. Generally, target rate maintenance process 210 manages to achieve the target rate with a minimally sufficient throttle rate without reducing the data downloading rate from those unreliable data sources 140. In this manner, the cooperative file distribution system 100 may maximize utilization of the lower cost unreliable data sources 140, and minimize the utilization of the higher cost reliable data sources 130.

Moreover, adjusting the throttle rate also includes detecting rate saturation by comparing the throttle rate to the actual downloading rate from the reliable data sources 130. If the actual downloading rate from the reliable data sources 130 is below the throttle rate, the reliable data sources 130 may be saturated. The target rate maintenance process 210 may reduce the throttle rate after detecting rate saturation. It is a benign behavior of the receiver 110 to keep the reliable data sources 130 healthy and robust.

Figure 3:
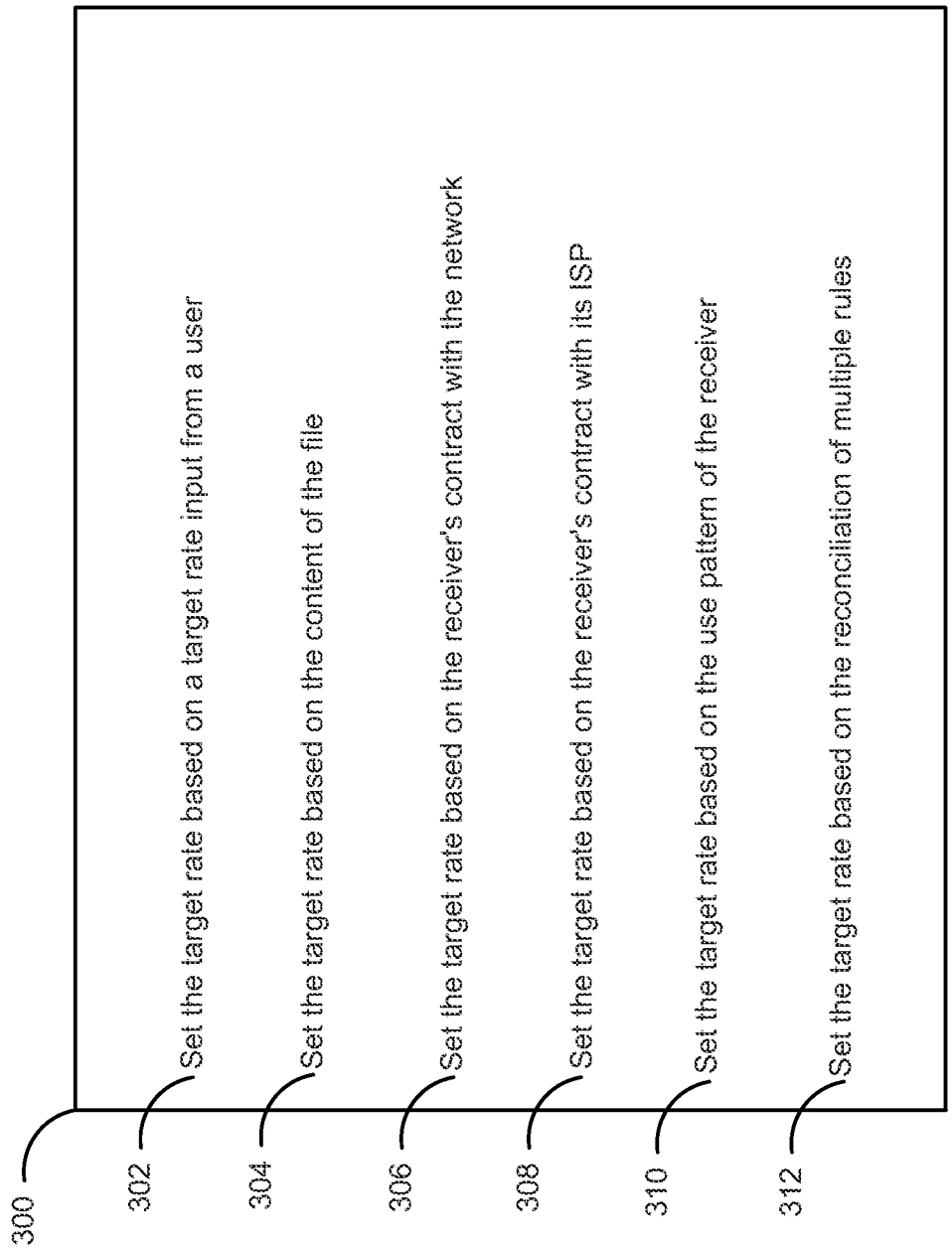
FIG. 3 is a table of an exemplary embodiment of a target rate rule base incorporating aspects of the present disclosure.

Now turning to FIG. 3, it is a table of an exemplary embodiment of a target rate rule base incorporating aspects of the present disclosure. The exemplary target rate rule base 300 includes a number of rules that can be used to determine a target rate for downloading a file. For example, a target rate can be set based on a target rate input from a user at the rule 302. Advantageously, this rule allows experienced users to expediently set up the target rate with or without further assistance.

According to the rule 304, a target rate can be set based on the content of the file. Virtually any file is stored as a linear array of bytes. File format generally determines how the bytes may be organized and interpreted. The format of a file may be indicated by its file extension in some operating systems such as Windows, Unix, and many Unix-likes. For example, the bytes of a plain text file, commonly associated with the .txt extension, are associated with either ASCII or UTF-8 characters and in turn may be distributed with ASCII mode data transfer. On the other side, the bytes of image, audio, and video files are generally in binary stream and should be distributed with the Binary mode data transfer. More interestingly, most file types also allocate a few bytes for metadata which carry some basic information about those files, such as the genre of a song or the encoded bit rate of a video stream. Those metadata are commonly archived by the control server 120 or the tracker 122. Therefore, the receiver 110 may obtain information of the content of a file from the control server 120 or the tracker 122 and set a target rate according to the content of the file. For example, the receiver 110 may set the target rate to match the encoded bit rate of a video stream in order to get smooth playback experience.

According to the rule 306, a target rate can be set based on the contract between the receiver 110 and the control server 120 which represents the file distribution network. The receiver 110 may have negotiated a contract with the control server 120 for obtaining files from the cooperative file distribution system 100. The contract may be based on a flat rate for unlimited data downloading or a downloading quota within a period of time such as a month. Alternatively, the contract may be based on a pay-per-use pricing model or other types of customized contract. Thus the receiver 110 may take advantage of its contract and set the target rate accordingly. For example, the receiver 110 may set a higher target rate if its monthly downloading quota has not been effectively utilized. As another example, the receiver 110 may set a thrifty target rate under the pay-per-use contact in the hope to obtain the file economically. In one embodiment, the receiver 110 may further expand the rule base with more detailed rules according to its contract with the control server 120. For example, it may set up a threshold based on the remaining downloading quota for adjusting its own behavior from data-hungry to data-thrifty in order to maximize its contract benefit. Advantageously, versatile pricing models are healthy and beneficial components of the ecosystem in the cooperative file distribution system 100 because they permit the receiver 110 to be smarter in setting up a target rate which induces a particular QoS level by balancing the current downloading needs and corresponding service fees based on a customized contract.

According to the rule 308, a target rate can be set based on the contract between the receiver 110 and its ISP. Historically ISPs with different access media, including dial-up, DSL, cable, satellite, power line, and cellular network, have set up various limitations for a user to access Internet. Limitations may be manifested as a bandwidth cap which limits the transfer of a specified amount of data over a period of time, a download quota which limits the volume of data downloaded during a fixed period, or even a peak rate limit which prevents bursting network traffics. Once the user hits the limitation, the user's Internet speed is usually throttled to a slower speed or the user is going to be charged for excess data usage at a much higher rate. Accordingly the target rate can be set based on the contract between the receiver 110 and its ISP. For example, the receiver 110 may set up a target rate to always below its peak rate limit. As another example, the receiver 110 may set up a target rate to be equal or below its bandwidth cap. Therefore, this rule permits the receiver 110 to monitor its contract with its ISP and set up a target rate without jeopardize its privilege to access other resources on the Internet or incur excess fees.

More interestingly, the contract with an ISP may include a time dependant rate schedule which would charge the receiver 110 with different fees to access the Internet based on time. Particularly cable-based ISPs are motivated to pursue this type of rate schedule because cable Internet users share the access network, so they may not receive adequate service during peak-usage times. In this case, the receiver 110 may set up a target rate to largely avoid the peak rate based on the time dependant rate schedule, for example, by setting the target rate to be zero or a tiny value during the peak rate hours. Alternatively, the receiver 110 may command the download process 212 to bypass the peak rate hours.

According to the rule 310, a target rate can be set based on the use pattern of the receiver 110. The use pattern of the receiver 110 may include ongoing activities related to the file being downloaded. For example, if the file being downloaded is actively been viewed or used such as a user is watching the video file, then the target rate may be set high enough to sustain the playback rate. The use pattern of the receiver 110 may also include activities unrelated to the file being downloaded. As an example, if the receiver 110 is currently engaged in heavy networking activities such as online gaming, then the target rate may be set to be equal to or less than the residual bandwidth to avoid network saturation.

Finally, according to the rule 312, a target rate can be set based on the reconciliation of multiple rules. In one embodiment, the receiver 110 may take a conservative approach to reconcile multiple rules based on the absolute minimum of all rules. For example, a high definition video file may demand for 5 Mbps target rate for a smooth playback. However, the receiver 110's contract with its ISP may limit its peak rate at 3 Mbps. In this case, the absolute minimum of the two rules should be obeyed because any target rate above the ISP's limitation on peak rate is futile. Alternatively the receiver 110 may take an intermediate value of multiple rules. For example, an audio file may only require 128 kbps to playback. However, the rule based on the use pattern of the receiver 110 may appreciate a residue bandwidth of 2 Mbps. In this case, the reconciliation of these two rules may take an intermediate value which gets a faster download and more effective utilization of the residue bandwidth.

Those skilled in the art will appreciate that the exemplary target rate rule base 300 only illustrates several rules, and additional rules may be incorporated into the target rule base 300. Moreover, a rule can be used independently but also be combined with other rules in any desirable order. For example, when a target rate is to be set based on the reconciliation of multiple rules, one or more rules may be designated by a user or determined by an algorithm to be reconciled.

Figure 4:
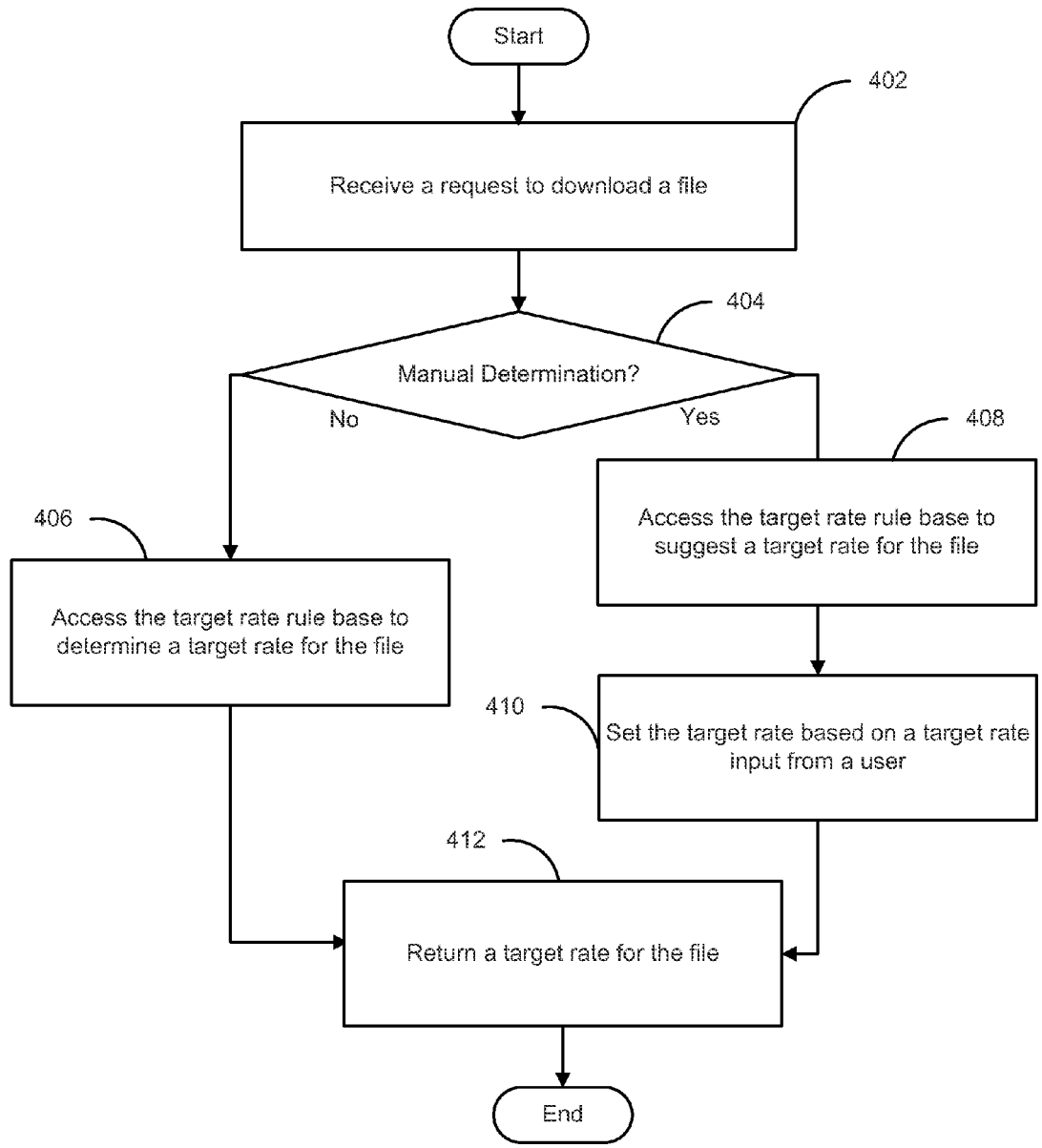
FIG. 4 illustrates a flowchart of an exemplary embodiment of a target rate determination process incorporating aspects of the present disclosure.

Now turning to FIG. 4, it illustrates a flowchart of an exemplary embodiment of a target rate determination process incorporating aspects of the present disclosure. As indicated at the process block 402, the process may include receiving a request to download a file. As indicated at the process block 404, the process may include checking whether the target rate should be determined manually. If the target rate should be determined without use input, as indicated at the process block 406, the process may include accessing the target rate rule base to determine a target rate for the file. On the other side, if the target rate should be determined manually, the process may include accessing the target rate rule base to suggest a target rate for the file at the process block 408, and setting the target rate based on a target rate input from a user at the process block 410. Finally, the process may include returning a target rate for the file at the process block 412.

Figure 5:
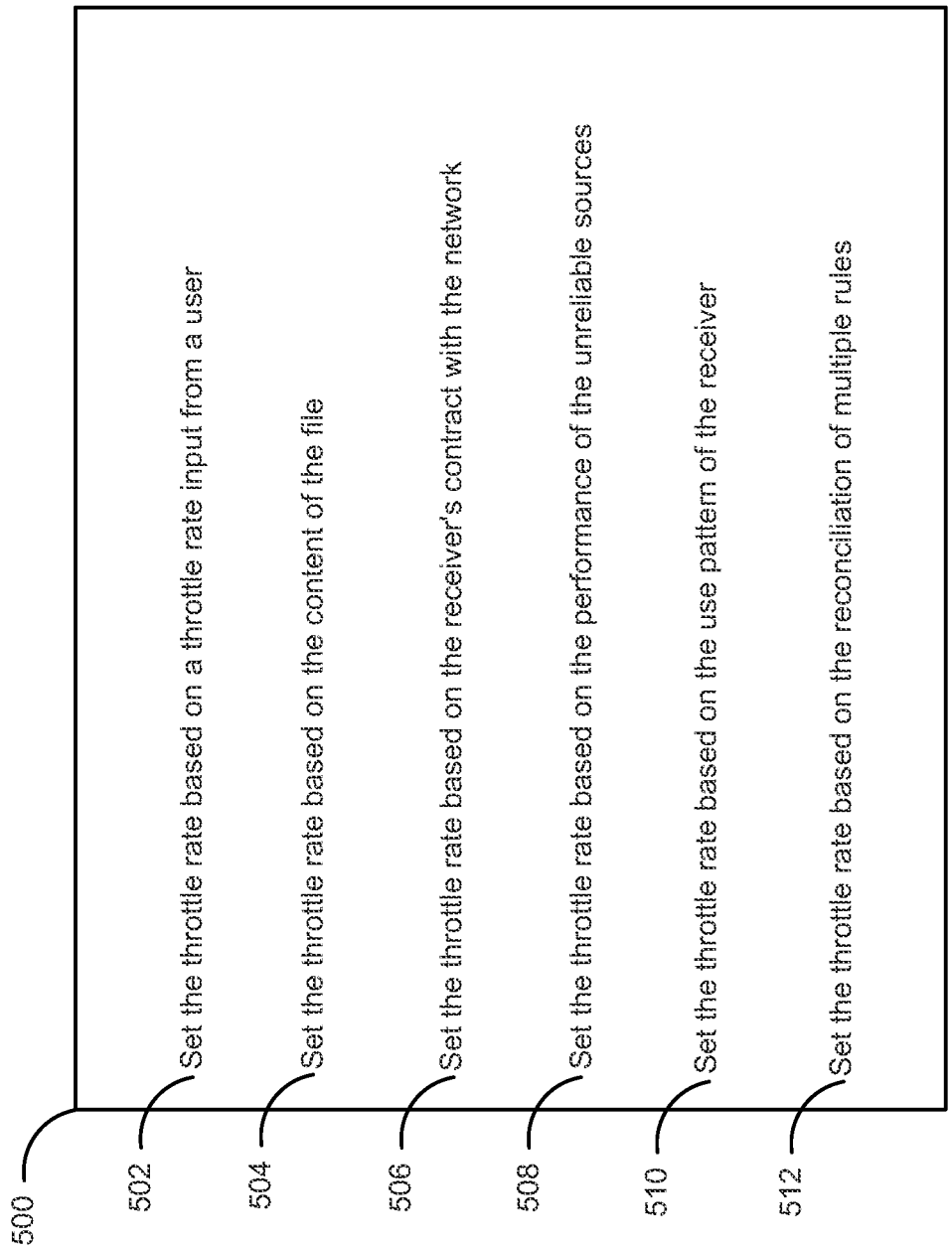
FIG. 5 is a table of an exemplary embodiment of a throttle rate rule base incorporating aspects of the present disclosure.

Now turning to FIG. 5, table of an exemplary embodiment of a throttle rate rule base incorporating aspects of the present disclosure is illustrated. The exemplary throttle rate rule base 500 includes a number of rules that can be used to determine a throttle rate for downloading a file. For example, the throttle rate can be set based on a throttle rate input from a user based on the rule 502. Advantageously, this rule allows experienced users to expediently set up the throttle rate with or without further assistance.

According to the rule 504, a throttle rate can be set based on the content of the file. With a mechanism similar as to the rule 304, the receiver 110 may obtain information of the content of a file from the control server 120 or the tracker 122 and set a throttle rate according to the content of the file. For example, the receiver 110 may set a higher throttle rate for a high definition video file and a lower throttle rate for a normal video file if the data rates for downloading fragments of these two files from unreliable data sources are similar. In this case, the throttle rate largely determines QoS for these two video files.

According to the rule 506, a throttle rate can be set based on the contract between the receiver 110 and the control server 120. With a mechanism similar as to the rule 306, the receiver 110 may have negotiated a contract with the control server 120 for obtaining data from the reliable data sources 130. The contract may be based on a flat rate for unlimited data downloading or a downloading quota within a period of time. Alternatively, the contract may be based on a pay-per-use pricing model or other types of customized contract. Thus the receiver 110 may take advantage of its contract and set the throttle rate accordingly. For example, the receiver 110 may set a higher throttle rate if its monthly downloading quota has not been fully utilized. As another example, the receiver 110 may set a thrifty throttle rate under the pay-per-use contact in the hope to obtain the file economically.

In one embodiment, the contract with the control server 120 may include a time dependant rate schedule which would charge the receiver 110 with different fees to access the reliable data sources 130 based on time. If the access to the reliable data sources 130 can be evenly distributed with time, the infrastructure of the reliable data sources 130 can be set up cost-effectively without reserving a large safety margin traditionally reserved for bursting traffic. In this case, the receiver 110 may set up a throttle rate to largely avoid the peak rate based on the time dependant rate schedule, for example, by setting the throttle rate to be zero or a tiny value during the peak rate hours. Alternatively, the receiver 110 may command the download process 212 to bypass the peak rate hours.

Advantageously, the receiver 110 may set up an arbitrary QoS level for a particular file by adjusting the throttle rate after balancing the current downloading needs and corresponding service fees. In one embodiment, the receiver 110 may set the QoS level to be zero or the lowest level which forces all data to be downloaded from the unreliable data sources 140 and avoids any fees. In this case, the throttle rate is to be set as zero. This scenario is especially common if the data downloading rate from unreliable data sources 140 is not below the target rate. On the other side, the receiver 110 may set the QoS level to be the highest level which forces all data to be downloaded from the reliable data sources 130 to secure a reliable downloading session.

According to the rule 508, a throttle rate can be set based on the performance of the unreliable data sources 140. The throttle rate controls the receiver 110's utilization of the reliable data sources 130 which are relatively scarce and expensive resources shared by all users. It is desirable to maximize utilization of the scalable and lower cost unreliable data sources 140 and minimize the utilization of the scarce and higher cost reliable data sources 130. Therefore in one embodiment, the receiver 110 may set the throttle rate just to be enough to achieve the target rate based on the performance of the unreliable data sources 140. For example, if the target rate is 1 Mbps, and the receiver 110 is able to download 0.5 Mbps from the unreliable data sources 140, then it is sufficient to request only 0.5 Mbps from the reliable data sources 130 to achieve the target rate of 1 Mbps. In general, one advantage of the cooperative file distribution system 100 is its scalability. Thus this rule generally precedes other rules to increase the scalability of the cooperative file distribution system 100 by first utilizing the unreliable data sources 140 before resorting to the reliable data sources 130.

According to the rule 510, a throttle rate can be set based on the use pattern of the receiver 110. The use pattern of the receiver 110 may include ongoing activities related to the file being downloaded. For example, if the file being downloaded is actively been viewed or used such as a user is watching the video file, then the throttle rate may be set high enough to sustain the playback rate. As another side, the use pattern of the receiver 110 may include activities unrelated to the file being downloaded. For example, if the receiver 110 has no user interaction for a long time, then the throttle rate maybe can be reduced because the user is not anxiously waiting online for the file.

Finally, according to the rule 512, a throttle rate can be set based on the reconciliation of multiple rules at the block 524. In one embodiment, the receiver 110 may take a conservative approach to reconcile multiple rules based on the absolute minimum of all rules. Alternatively the receiver 110 may take an intermediate value of multiple rules. For example, a target rate of 3 Mbps is set for a video file in order to achieve smooth playback, and the receiver 110 is already receiving 2 Mbps from the unreliable data sources 140. However, the receiver 110 may be privileged to download unlimited data from the reliable data sources 130 based on its contract with the control server 120. Therefore, the receiver 110 may set the throttle rate to be somewhere above the bare minimum of 1 Mbps to not only achieve its target rate but reserve a safety margin to secure a faster download session.

Those skilled in the art will appreciate that the exemplary throttle rate rule base 500 only illustrates several rules, and additional rules may be incorporated into the throttle rule base 500. Moreover, a rule can be used independently but also be combined with other rules in any desirable order. For example, when a throttle rate is to be set based on the reconciliation of multiple rules, one or more rules may be designated by a user or determined by an algorithm to be reconciled.

Figure 6:
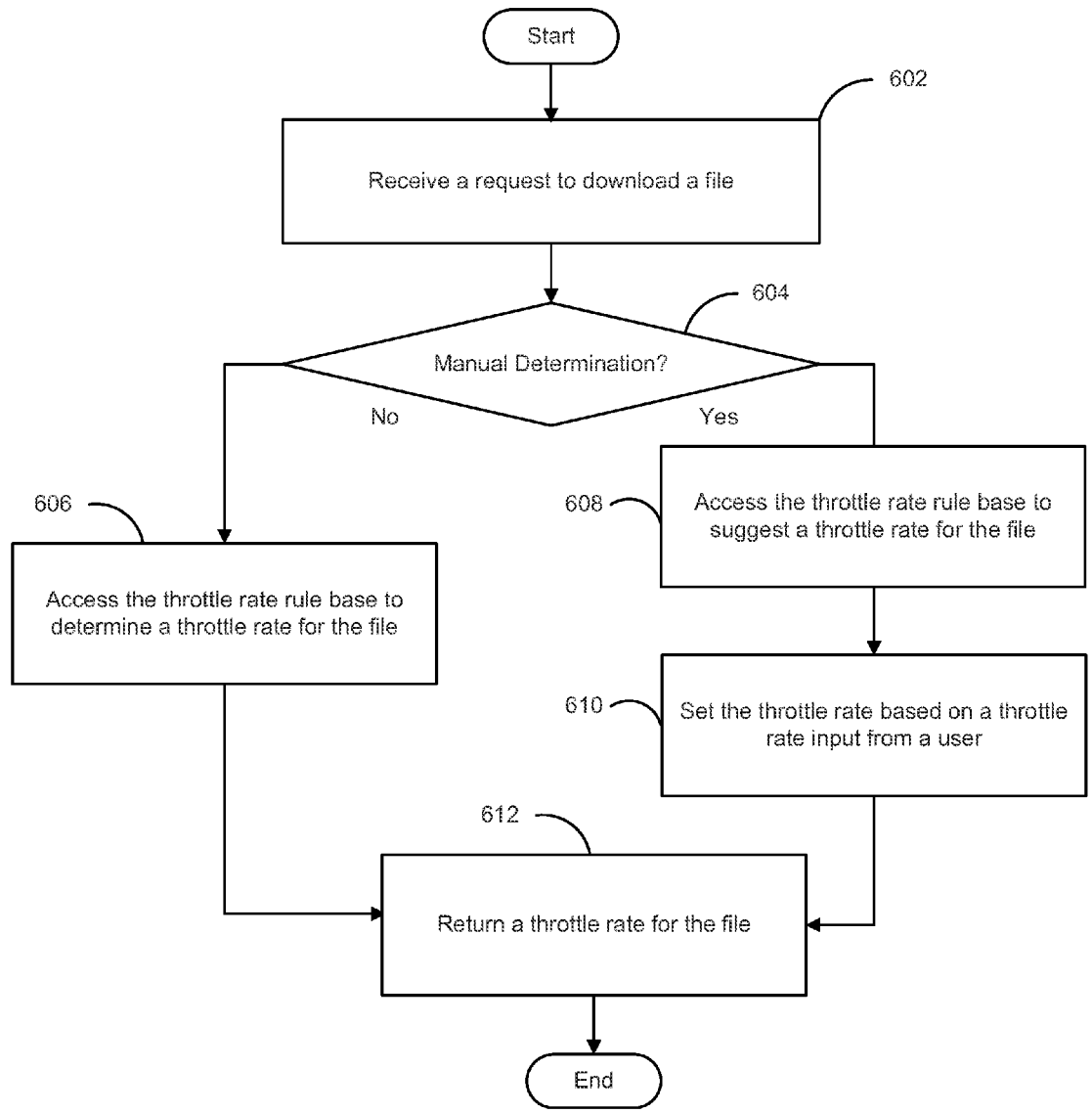
FIG. 6 illustrates a flowchart of an exemplary embodiment of a throttle rate determination process incorporating aspects of the present disclosure.

Now turning to FIG. 6, it illustrates a flowchart of an exemplary embodiment of a throttle rate determination process incorporating aspects of the present disclosure. As indicated at the process block 602, the process may include receiving a request to download a file. As indicated at the process block 606, the process may include checking whether the throttle rate should be determined manually. If the throttle rate should be determined without any use input, as indicated at the process block 606, the process may include accessing the throttle rate rule base to determine a throttle rate for the file. On the other hand, if the throttle rate should be determined manually, the process may include accessing the throttle rate rule base to suggest a throttle rate for the file at the process block 608, and setting the throttle rate based on a throttle rate input from a user at the process block 610. Finally, the process may include returning a throttle rate for the file at the process block 612.

Figure 7:
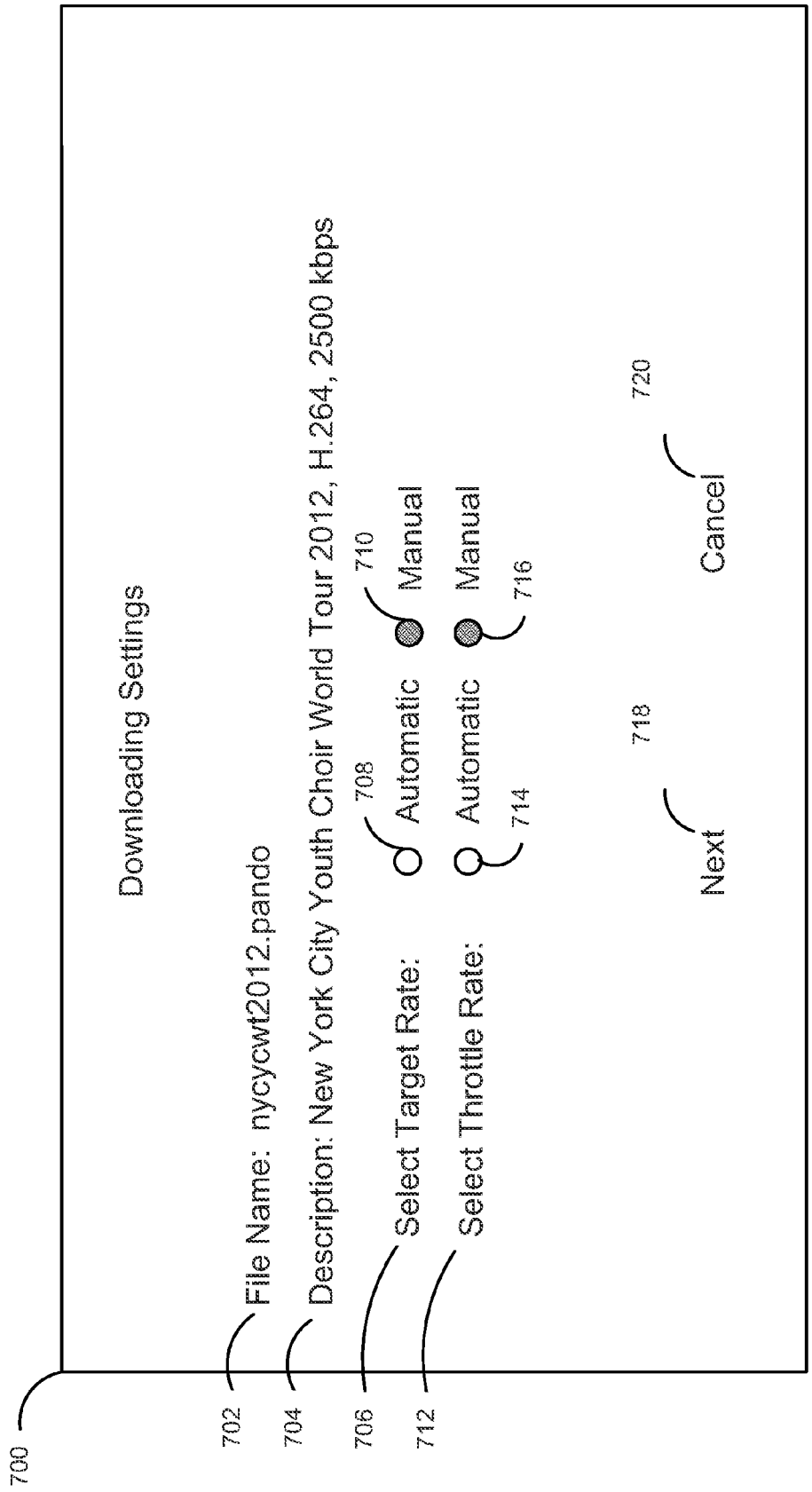
FIG. 7 illustrates an exemplary screen of user options for configuring downloading settings incorporating aspects of the present disclosure.

Now turning to FIG. 7, it illustrates an exemplary screen of user options for configuring downloading settings incorporating aspects of the present disclosure. The screen 700 generally provides options for a user to choose either manually or automatically set up the target rate and the throttle rate for a file. In this instance, it is noted that the file name 702 is nycycwt2012.pando, and the file description 704 indicates that the content is about the New York City Youth Choir World Tour 2012 and it is coded in the H.264 format at 2500 kbps. The options for selecting target rate 706 include either automatic 708 or manual 710. Similarly the options for selecting throttle rate 712 include either automatic 714 or manual 716. Additionally, a user may click the next 718 after setting those options to enter a follow up screen or click cancel 720 to return to the previous screen.

Figure 8:
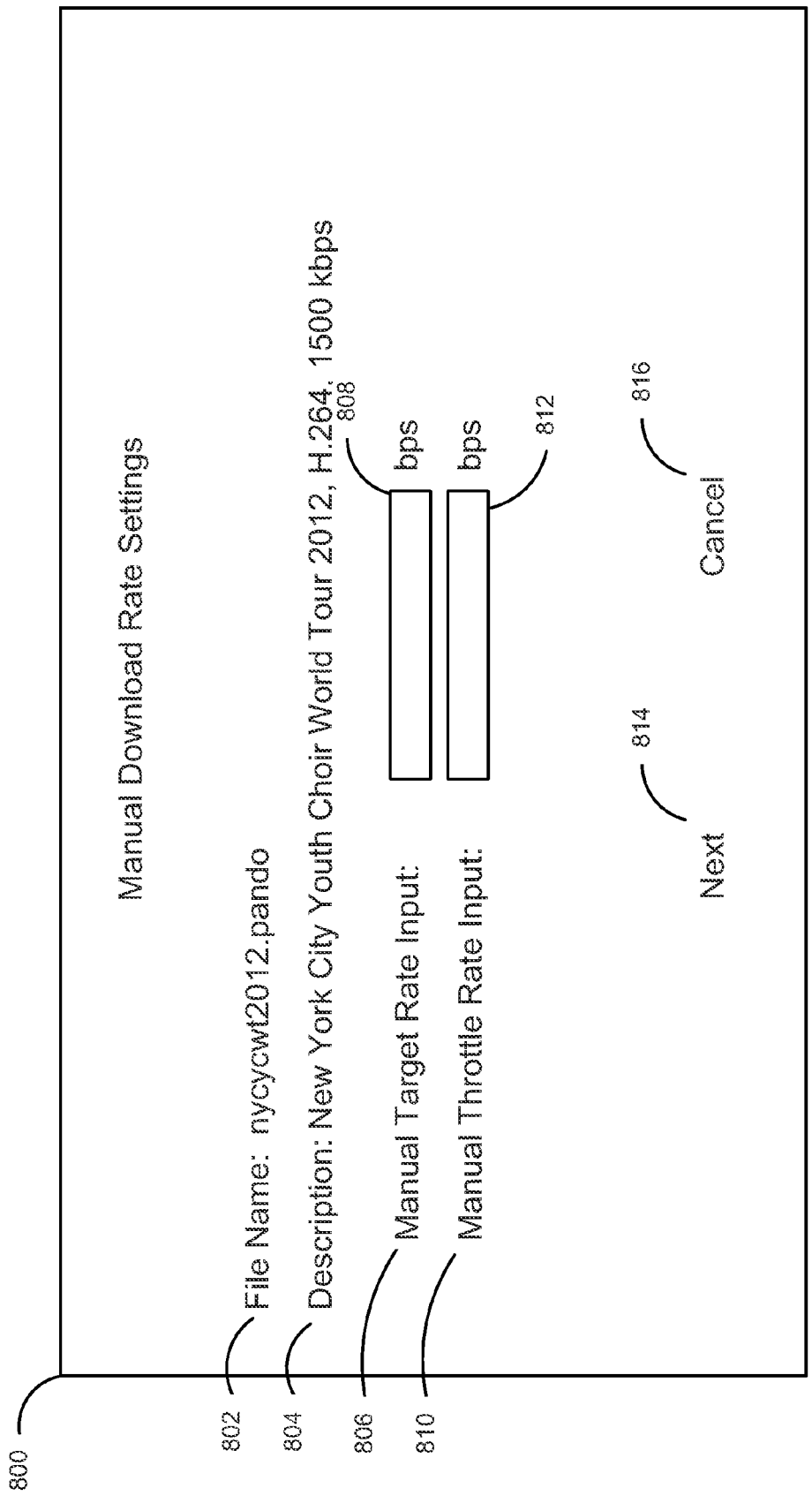
FIG. 8 illustrates an exemplary screen of user options for configuring downloading rate settings incorporating aspects of the present disclosure.

Now turning to FIG. 8, it illustrates an exemplary screen of user options for configuring downloading rate settings incorporating aspects of the present disclosure. The screen 800 generally provides options for a user to manually set up the target rate and the throttle rate for a file. Similar to the screen 700, the file name 702 is nycycwt2012.pando, and the file description 704 indicates that the content is about the New York City Youth Choir World Tour 2012 and it is coded in the H.264 format at 2500 kbps. Moreover, following the manual target rate input 806, a user may enter a desirable target rate measured in bps at the input box 808. By the same token, following the manual throttle rate input 810, the user may enter a desirable throttle rate measured in bps at the input box 812. Furthermore, the user may click the next 814 after setting those options to enter a follow up screen or click cancel 816 to return to the previous screen.

Figure 9:
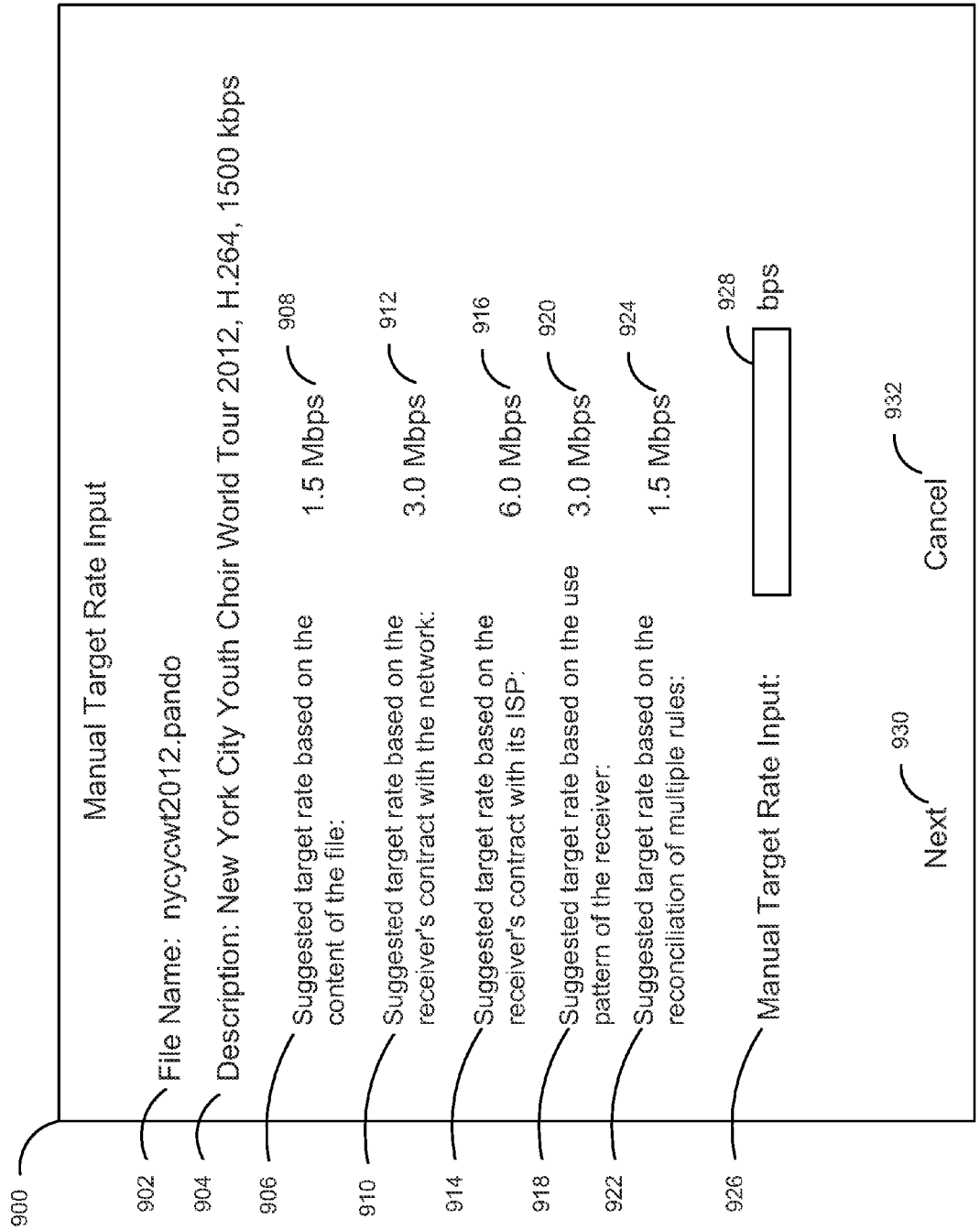
FIG. 9 illustrates an exemplary screen of user options for configuring target rate incorporating aspects of the present disclosure.

Now turning to FIG. 9, it illustrates an exemplary screen of user options for configuring target rate incorporating aspects of the present disclosure. In this embodiment, the screen 900 permits a user to either select a suggested target rate or manually input a target rate. Similarly general information of the file is provided such as the file name 902 of nycycwt2012.pando and the file description 904 indicating that the content is about the New York City Youth Choir World Tour 2012 and it is coded in the H.264 format at 2500 kbps. Moreover, suggested target rates based on various considerations are provided, including the suggested target rate based on the content of the file 906 which is 1.5 Mbps 908, the suggested target rate based on the receiver's contract with the network 910 which is 3.0 Mbps 912, the suggested target rate based on the receiver's contract with its ISP 914 which is 6.0 Mbps 916, the suggested target rate based on the use pattern of the receiver 918 which is 3.0 Mbps 920, and the suggested target rate based on the reconciliation of multiple rules 922 which is 1.5 Mbps 924. Furthermore, a user may manually input a target rate at the input field 928 by following the manual target rate input 926. Finally the user may click the next 930 after setting those options to enter a follow up screen or click cancel 932 to return to the previous screen. Meanwhile those skilled in the art will appreciate that any suggested value among 908, 912, 916, 920, and 924 may be selectable if the user decides to follow with one of those suggestions.

Advantageously, the screen 900 accommodates both experienced and inexperienced users. An inexperienced user may appreciate the suggestions from the system and take an informed decision after reviewing all suggestions. On the other side, an experienced user may choose to manually set the target rate based on her prior experience as well as those system suggestions.

Figure 10:
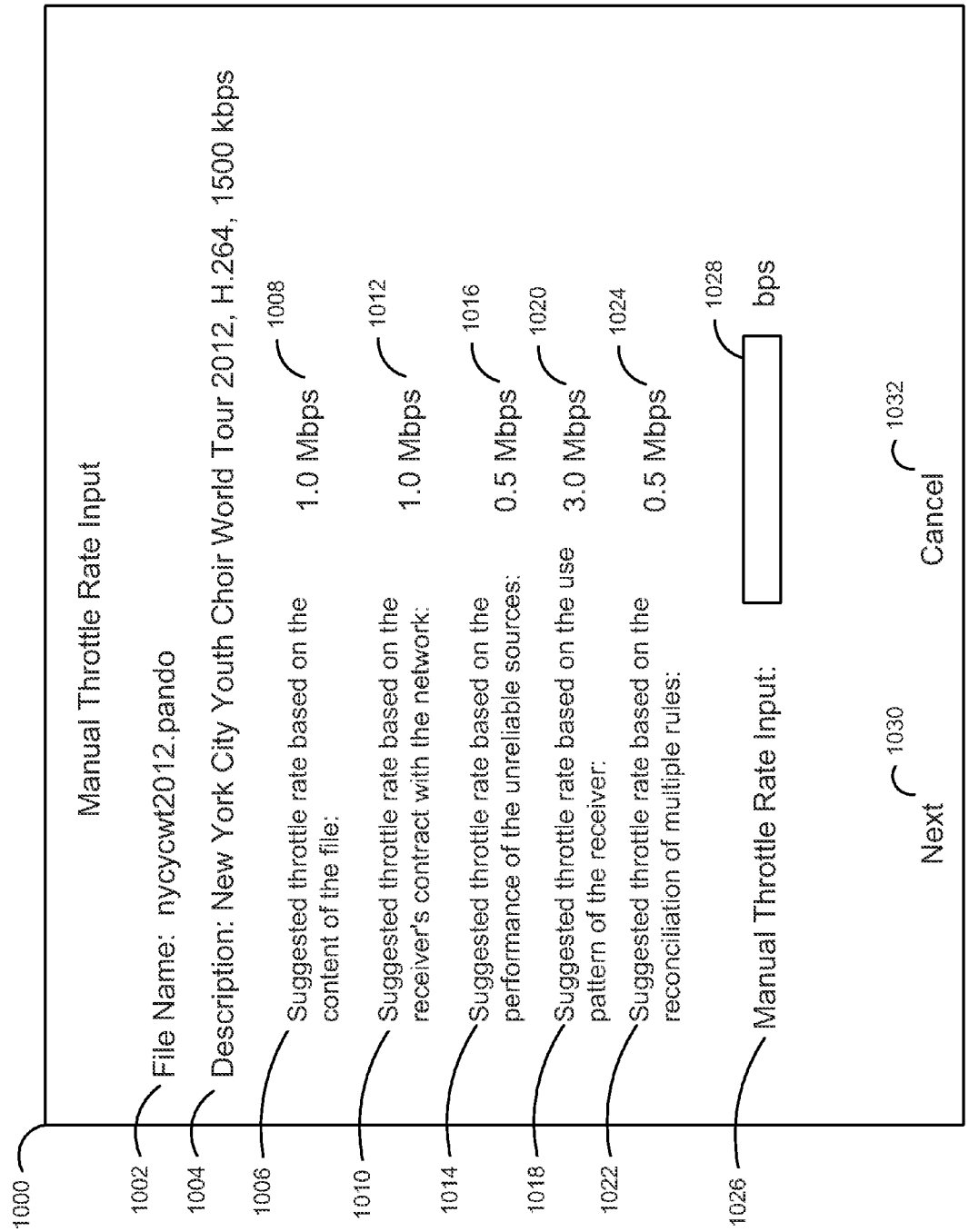
FIG. 10 illustrates an exemplary screen of user options for configuring throttle rate incorporating aspects of the present disclosure.

Now turning to FIG. 10, it illustrates an exemplary screen of user options for configuring throttle rate incorporating aspects of the present disclosure. In this embodiment, the screen 1000 permits a user to either select a suggested throttle rate or manually input a throttle rate. Similarly general information of the file is provided such as the file name 1002 of nycycwt2012.pando and the file description 1004 indicating that the content is about the New York City Youth Choir World Tour 2012 and it is coded in the H.264 format at 2500 kbps. Moreover, suggested throttle rates based on various considerations are provided, including the suggested throttle rate based on the content of the file 1006 which is 1.0 Mbps 1008, the suggested throttle rate based on the receiver's contract with the network 1010 which is 1.0 Mbps 1012, the suggested throttle rate based on performance of the unreliable sources 1014 which is 0.5 Mbps 1016, the suggested throttle rate based on the use pattern of the receiver 1018 which is 3.0 Mbps 1020, and the suggested throttle rate based on the reconciliation of multiple rules 1022 which is 0.5 Mbps 1024. Furthermore, a user may manually input a throttle rate at the input field 1028 by following the manual throttle rate input 1026. Finally the user may click the next 1030 after setting those options to enter a follow up screen or click cancel 1032 to return to the previous screen. Meanwhile those skilled in the art will appreciate that any suggested value among 1008, 1012, 1016, 1020, and 1024 may be selectable if the user decides to follow with one of those suggestions.

Advantageously, the screen 1000 accommodates both experienced and inexperienced users. An inexperienced user may appreciate the suggestions from the system and take an informed decision after reviewing all suggestions. On the other side, an experienced user may choose to manually set the throttle rate based on her prior experience as well as those system suggestions.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit or scope of the invention.

Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for downloading a file to a computing device in a cooperative file distribution system, comprising:
   at the computing device, selecting a target rate for downloading the file to the computing device;
   at the computing device, identifying one or more unreliable data sources and one or more reliable data sources wherein each source contains one or more portions of the file;
   at the computing device, obtaining at least a portion of the file from the one or more unreliable data sources at a first rate;
   at the computing device, determining a throttle rate for downloading at least another portion of the file from the one or more reliable data sources;
   at the computing device, retrieving the at least another portion of the file from the one or more reliable data sources;
   at the computing device, adjusting the throttle rate such that an amount of data obtained from the one or more reliable data sources is minimized, and the target rate is maintained when the one or more reliable data sources are not saturated; and
   at the computing device, reducing the throttle rate such that the target rate is not maintained when the one or more reliable data sources are saturated.

2. The method of claim 1 wherein the target rate is based on a target rate input from a user.

3. The method of claim 1 wherein the target rate is based on a content of the file.

4. The method of claim 1 wherein the target rate is based on a use pattern of the computing device.

5. The method of claim 1 wherein the target rate is based on a residual bandwidth of the computing device.

6. The method of claim 1 wherein the target rate is based on a QoS contract with the cooperative file distribution system.

7. The method of claim 1 wherein determining or adjusting the throttle rate is based on a throttle rate input from a user.

8. The method of claim 1 wherein determining or adjusting the throttle rate is based on the first rate.

9. The method of claim 1 wherein determining or adjusting the throttle rate is based on a QoS contract with the cooperative file distribution system.

10. The method of claim 1 wherein determining or adjusting the throttle rate is based on a use status of the file.

11. The method of claim 1 wherein the at least another portion of the file from the one or more reliable data sources is retrieved at a zero rate if the first rate is not below the target rate.

12. The method of claim 1 wherein adjusting the throttle rate further comprises detecting a rate saturation by comparing the throttle rate to a second rate at which the at least another portion of the file from the one or more reliable data sources is retrieved.

13. The method of claim 12, wherein reducing the throttle rate includes reducing the throttle rate such that the target rate is not maintained when the first rate is less than the target rate and the one or more reliable data sources are saturated.

14. The method of claim 1 wherein the one or more reliable data sources have a time dependent rate schedule.

15. The method of claim 14 wherein the retrieving step is configured to avoid a peak rate.

16. A system for downloading a file in a cooperative file distribution system, comprising:
    a control server; and
    a receiver operatively coupled with the control server, operative to:
        select a target rate for downloading the file to the receiver;
        identify one or more unreliable data sources and one or more reliable data sources wherein each source contains one or more portions of the file;
        obtain at least a portion of the file from the one or more unreliable data sources at a first rate;
        determine a throttle rate for downloading at least another portion of the file from the one or more reliable data sources;
        retrieve the at least another portion of the file from the one or more reliable data sources;
        adjust the throttle rate such that an amount of data obtained from the one or more reliable data sources is minimized, and the target rate is maintained when the one or more reliable data sources are not saturated; and
        reduce the throttle rate such that the target rate is not maintained when the one or more reliable data sources are saturated.

17. The system of claim 16 wherein the target rate is based on a target rate input from a user.

18. The system of claim 16 wherein the target rate is based on a content of the file.

19. The system of claim 16 wherein the target rate is based on a use pattern of the system.

20. The system of claim 16 wherein the target rate is based on a residual bandwidth of the system.

21. The system of claim 16 wherein the target rate is based on a QoS contract with the cooperative file distribution system.

22. The system of claim 16 wherein a throttle rate input from a user is used to determine or adjust the throttle rate.

23. The system of claim 16 wherein the first rate is used to determine or adjust the throttle rate.

24. The system of claim 16 wherein a QoS contract with the cooperative file distribution system is used to determine or adjust the throttle rate.

25. The system of claim 16 wherein a use status of the file is used to determine or adjust the throttle rate.

26. The system of claim 16 wherein the at least another portion of the file from the one or more reliable data sources is retrieved at a zero rate if the first rate is not below the target rate.

27. The system of claim 16 wherein the receiver is configured to detect a rate saturation by comparing the throttle rate to a second rate at which the at least another portion of the file from the one or more reliable data sources is retrieved.

28. An article of manufacture for downloading at least one file in a cooperative file distribution system, comprising a machine readable storage medium comprising one or more program instructions which when executed implement the steps of:
    selecting a target rate by a receiver for downloading the file to the receiver;
    identifying one or more unreliable data sources and one or more reliable data sources by the receiver wherein each source contains one or more portions of the file;
    obtaining at least a portion of the file from the one or more unreliable data sources at a first rate;
    determining a throttle rate by the receiver for downloading at least another portion of the file from the one or more reliable data sources;
    retrieving the at least another portion of the file from the one or more reliable data sources; and
    adjusting the throttle rate by the receiver such that an amount of data obtained from the one or more reliable data sources is minimized, and the target rate is maintained when the one or more reliable data sources are not saturated; and
    reducing the throttle rate such that the target rate is not maintained when the one or more reliable data sources are saturated.

* * * * *